United States Patent [19]
Epstein et al.

[11] 4,121,020
[45] Oct. 17, 1978

[54] ULTRA-THIN BUTTON-TYPE PRIMARY ELECTROCHEMICAL CELL

[75] Inventors: James Epstein, Sharon; William P. Brissette, Halifax, both of Mass.

[73] Assignee: GTE Laboratories Incorporated, Waltham, Mass.

[21] Appl. No.: 834,745

[22] Filed: Sep. 19, 1977

Related U.S. Application Data

[63] Continuation of Ser. No. 761,353, Jan. 21, 1977, abandoned, which is a continuation of Ser. No. 612,056, Sep. 10, 1975, abandoned, which is a continuation-in-part of Ser. No. 539,751, Jan. 9, 1975, abandoned.

[51] Int. Cl.$^2$ ............................................ H01M 6/12
[52] U.S. Cl. .................................. 429/162; 429/174; 429/185; 429/196
[58] Field of Search ............... 429/162, 196, 174, 185, 429/218

[56] References Cited

U.S. PATENT DOCUMENTS

| | | | |
|---|---|---|---|
| 3,413,239 | 11/1968 | Olstowski et al. | 429/218 X |
| 3,551,205 | 12/1970 | Fraioli et al. | 429/218 X |
| 3,853,627 | 12/1974 | Lehmann | 429/218 X |
| 3,891,457 | 6/1975 | Auborn | 429/218 X |
| 3,891,458 | 6/1975 | Eisenberg | 429/218 X |
| 3,920,478 | 11/1975 | Kozawa | 429/220 X |

*Primary Examiner*—Charles F. Lefevour
*Attorney, Agent, or Firm*—Fred Fisher; Robert A. Seldon; Irving M. Kriegsman

[57] ABSTRACT

An unconventionally thin button-type primary electrochemical cell is described in which a pair of shallow, opposed, dished cover members formed of a conductive metallic material are positioned with an electrically insulating sealing gasket therebetween so that the respective cover members may act as terminals of the primary electrochemical cell. A thin preformed porous carbon cathode disc is fitted within and in mechanical and electrical contact with the inner surface of one of the cover members and a thin alkali metal anode disk is fitted within and in mechanical and electrical contact with the inner surface of the other of the cover members. A thin porous separator of electrically nonconductive material is interposed between the anode and the cathode. A quantity of an electrolyte solution comprising a solute dissolved in an inorganic oxyhalide or thiohalide solvent is diffused throughout the porous carbon cathode and the porous separator. The cathode is formed with a binding agent which decreases cathode rigidity and thereby enables the cathode to absorb the flexing to which an ultra-thin cell is subjected.

1 Claim, 2 Drawing Figures

ULTRA-THIN BUTTON-TYPE PRIMARY ELECTROCHEMICAL CELL

REFERENCE TO PARENT APPLICATION

This application is a continuation of application S.N. 761,353 filed Jan. 21, 1977 which is a continuation of then co-pending U.S. Ser. No. 612,056, filed Sept. 10, 1975, the priority of which is hereby claimed and which, in turn, is a continuation-in-part of U.S. Ser. No. 539,751, filed on Jan. 9, 1975, all now abandoned.

BACKGROUND OF THE INVENTION

The present invention is related generally to primary electrochemical cells and is more particularly concerned with a novel construction for such cells which results in an ultrathin compact configuration.

Primary electrochemical cells are utilized for a wide variety of applications and are commonly available in a significant assortment of sizes and shapes. One such application which is of continuing importance is the incorporation of a power source into electronic watches. Such power sources are required to supply a low current over an extended period of time. Primary electrochemical cells are available which perform this function; however, the commercially available cells suffer from one or more disadvantages which preclude complete freedom to the designer of the watches. Firstly, the discharge capacity of the cell needed to provide an acceptable useful life limits the size to which the cell may be reduced. Typically, it is required that the cells power the watch for a minimum of one year. Secondly, the cell configurations which have been available are sufficiently bulky as to dictate the configuration that the watch casing may take, particularly with regards to thickness.

Typically, a total thickness of approximately 5 millimeters has been required for prior art button cells. Although the thickness of all cell components could theoretically be reduced to achieve a thinner cell, the structural limitation of approximately 5mm is predominately imposed by the rigidity of the cell cathode. Conventional cathode materails are rigid structures incapable of absorbing the flexing of the thinner cell containers. The rigidity has been attributable to the need for physical contact between a maximum number of cathodic particles to yield the requisite conductivity and mechanical strength.

U.S. Pat. No. 3,852,115 to Richard W. Lewis et al. discloses a button type cell in which alkaline electrolyte is mixed in with a zinc amalgam anode material which is separated from the cathode assembly by one or more plastic microporous separators.

U.S. Pat. No. 3,666,560 to Elton J. Cairns et al. discloses a cell in which an electrolyte in the form of a paste disc is sandwiched between the anode and the cathode.

U.S. Pat. No. 3,907,593, assigned to the assignee of this application, discloses a button type cell in which a liquid electrolyte is in a compartment sandwiched between the cathode and anode and separated from the cathode by a spacer.

Other cell arrangements may be found in U.S. Pat. No. 2,812,377 to John V. Franquemont, U.S. Pat. No. 3,853,627 to Gerard Lehmann et al., U.S. Pat. No. 3,880,672 to El Sayed Megaked et al. and U.S. Pat. No. 3,920,478 to Kozawa.

SUMMARY OF THE INVENTION

Accordingly, it is an object of the present invention to provide a new and improved ultra-thin button-type primary electrochemical cell.

It is another object of the present invention to provide such a cell which may be produced quickly and economically.

The minimum thickness of conventional cathodes has generally been limited by the nature of the process by which they are formed. The uniform particle density necessary for maximum particle contact is normally achieved by a compacting process, such as a punch and die, which depends upon an even redistribution of powdered cathodic material along the cathode surface during the compacting operation. However, sufficient redistribution does not occur in cathodes having large surface-to-thickness ratios.

Briefly, the invention in its broadest aspect is an ultra-thin button-type electrochemical cell. In the cell, a pair of shallow, opposed, dished cover members formed of a conductive material are utilized. The outer rim of the first one of the members fits within the outer rim of the second cover member so that a disc-shaped space is formed therebetween. An electrically insulating sealing gasket is positioned between the outer rims of the cover members to electrically isolate the cover members from each other so that the respective cover members may serve as terminals of the primary electrochemical cell. The outer rim of the first one of the cover members is compressed against the sealing gasket thereby forcing the sealing gasket against the second cover member to seal the primary electrochemical cell. A thin preformed porous carbon cathode disc formed with a binding agent is fitted within and in mechanical and electrical contact with the inner surface of one of the cover members. A thin alkali metal anode disc is fitted within and in mechanical and electrical contact with the inner surface of the other of the cover members. A thin porous separator of electrically non-conductive material is interposed between the anode and cathode. An effective quantity of an electrolytic solution comprising a solute dissolved in an inorganic oxyhalide or thiohalide solvent is diffused throughout the porous carbon cathode and the porous separator.

DETAILED DESCRIPTION OF THE PREFERRED EMBODIMENT

Figure 1:
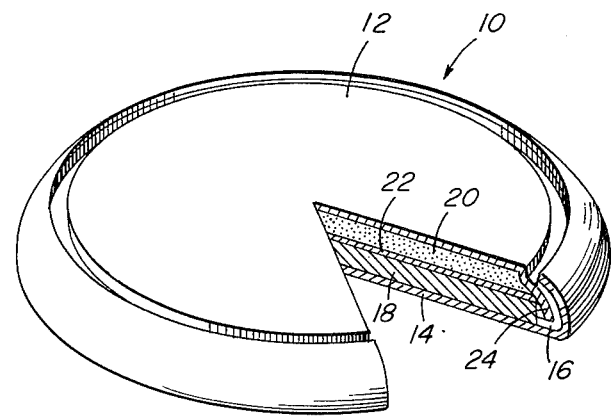
FIG. 1 is an isometric view of an ultra-thin button-type primary electrochemical cell according to the present invention which is partially broken away to show the internal structure thereof.

In referring to the various figures of the drawing hereinbelow, like reference numerals will be utilized to refer to identical parts of the apparatus.

Figure 2:
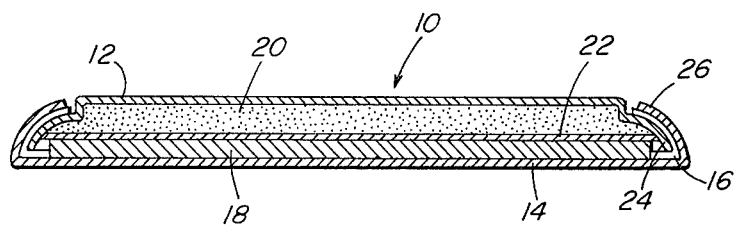
FIG. 2 is an enlarged cross-sectional view of the primary electrochemical cell shown in FIG. 1 wherein further details of the construction thereof may be seen.

Referring initially to FIGS. 1 and 2 of the drawing, there is shown an ultra-thin button-type primary electrochemical cell which is designated generally by the reference numeral 10. The exterior of the cell 10 is comprised of a pair of shallow opposed, dished cover members 12 and 14 which are formed of a conductive material. The members 12 and 14 have an electrical insulating sealing gasket 16 interposed therebetween to isolate the respective cover members from each other. The preferred form of the sealing gasket 16 is one which has an L-shaped rim. The base of the L extends radially inwardly and forms a ledge on which the outer rim 24 of one of the cover members 12 rests. The other of the cover members 14 is of slightly larger diameter and has an outer rim 26 extending along the outside of the upright portion of the L. The outer rim 24 is formed with a curved flared portion. In the manufacturing process, the outer rim 26 of the outer cover member 14 is crimped or rolled inwardly so that the sealing gasket 16 is distorted inwardly against the outer surface of the rim 24 so that a sealing contact is made between the rims 24 and 26 and the interposed sealing gasket 16.

The presently preferred material from which the gasket 16 is formed is a fluorocarbon polymer such as is available commercially under the tradenames Teflon and Kel-F. Teflon is a registered trademark of the E. I. duPont de Nemours and Company for tetrafluoroethylene fluorocarbon polymers and fluorinated ethylene-propylene resins. Kel-F is a registered trademark of the 3M Company for a series of fluorocarbon products including polymers, of chlorotrifluoroethylene and certain copolymers. Either of these commercially available products may be utilized in the present construction with essentially identical results.

A thin preformed porous carbon cathode disc 18 is fitted within and in electrical and mechanical contact with the inner surface of cover member 14. The size of the disc is determined by the inward extent of the base of the L of sealing gasket 16 since contact with the outer rim 24 of the other cover member 12 would cause shorting and failure of the cell. The preferred form of the preformed cathode disc 18 is a thin, sheet-like configuration wherein a mixture of graphite and carbon black particles are cured with a mechanical binder on a metallic current collector. The current collector, in the preferred embodiment, is a nickel screen. The nickel screen may then be spot-welded or similarly attached to the cover member 14 insuring good mechanical and electrical contact.

The cathode disc 18 generally comprises a semi-rigid material having a composition of from 40 to 99 weight percent of carbon black, at least 1 weight percent an inert binder, the remainder being graphite. A material is formed by mixing carbon black with an effective amount of a suitable liquid to form a uniform slurry. A quantity of binder is added and the slurry remixed to uniformly disperse the binder throughout. The slurry is then formed into the desired shape for the cathode and cured for a time sufficient to remove substantially all of the liquid as stabilize the binder.

The following table provides a number of examples of specific carbon cathode compositions:

| Example No. | Graphite wt.% | Carbon Black wt.% | Fluorocarbon Polymer Binder - wt.% |
|---|---|---|---|
| 1 | 0 | 99 | 1.0 |
| 2 | 0 | 98 | 2.0 |
| 3 | 0 | 95 | 5.0 |
| 4 | 2.5 | 95 | 2.5 |
| 5 | 3.5 | 93 | 3.5 |
| 6 | 5.0 | 90 | 5.0 |
| 7 | 10 | 85 | 5.0 |
| 8 | 15 | 80 | 5.0 |
| 9 | 20 | 70 | 10.0 |
| 10 | 23 | 74 | 3.0 |
| 11 | 25 | 68 | 7.0 |
| 12 | 25 | 70 | 5.0 |
| 13 | 30 | 65 | 5.0 |
| 14 | 34 | 60 | 6.0 |
| 15 | 38 | 57 | 5.0 |
| 16 | 40 | 55 | 5.0 |
| 17 | 45 | 50 | 5.0 |
| 18 | 50 | 42 | 8.0 |
| 19 | 50 | 40 | 10.0 |
| 20 | 58 | 40 | 2.0 |

The graphite and carbon black utilized in the formation of the preformed cathodes are preferably of commercial grade or better purity. The graphite particle size is preferably maintained below 650 mesh and the carbon black utilized is preferably compressed about 50%. These preferred specifications for the graphite and carbon black are selected to insure a homogeneous product which will not contribute to a deterioration of the discharge parameters of the cell through the incorporation of the reactive impurities in the cell.

The preferred mechanical binder for utilization in the preformed cathodes of the present invention is a fluorocarbon polymer which is inert in the primary electrochemical cell of the invention. Two examples of preferred fluorocarbon polymers of particular utility in the present invention are those identified by the tradenames Teflon and Kel-F. Teflon is a registered trademark of E. I. duPont de Nemours and Company for tetrafluoroethylene fluorocarbon polymers and fluorinated ethylene-propylene resins. Kel-F is a registered trademark of the 3M Company for a series of fluorocarbon products including polymers, of chlorotrifluoroethylene and certain copolymers. The examples of the foregoing table may utilize either of these commercially available fluorocarbon polymers with essentially equivalent results. The function of the fluorocarbon polymer in the present invention is to stabilize the mechanical strength of the cathode by forming chain-like connections between the various particles of graphite and carbon black to form a mechanical binding network so that a semi-rigid configuration may be achieved for the preformed cathode.

The particular compositions for the preformed cathode which are preferred are given in weight percent for the resulting article:

Graphite: 0–30
Carbon Black: 65–99
Fluorocarbon polymers: 1–10

The particular composition chosen results in a cathode having varying porosity characteristics. This variance in porosity is beneficial because it permits a concomitant variance in the discharge rates available from the resulting primary electrochemical cell.

The preformed cathode is produced according to a method which is described in U.S. Ser. No. 539,748. As a specific example of that method, the following procedure is provided.

EXAMPLE

About 350 grams of carbon black are dry mixed with about 35 grams of graphite for about 15 hours. Approximately 6 liters of a 50% isopropanol solution in water is added to the dry mixed carbon and graphite. This is mixed for about 2 additional hours. Approximately 5% by weight, of the dry mix, of Teflon in suspension is added to the slurry of carbon and graphite as a mechanical binder and mixing continued to disperse the Teflon uniformly through the slurry. Any excess of the isopropanol solution may be pressed out. The remainder is now in the form of a dough which is formed into the desired shape such as a cylinder. The formed wet cathodes are dried initially for about 15 hours at room temperature and then cured at approximately 300° C. for about 2 to 3 hours.

The relative concentrations of the carbon black, graphite and mechanical binder may be varied according to the ranges set forth hereinabove.

The dry mixing of the carbon black and graphite is done to achieve a uniform distribution between the carbon and graphite particles. The time required for this procedure is largely a function of the equipment used. In fact, in those instances where no graphite paticles are used or in which sufficient wet mixing time is used, the dry mixing step may be eliminated; however, it remains in the presently preferred method.

The liquid is a matter of choice so long as it succeeds in wetting the carbon and graphite particles. The quantity of liquid to be utilized varies according to the choice of liquid and the properties of the dough needed for the particular forming operation. A determination of such effective quantities is standard to one of ordinary skill in the art.

Preferably, the suitable liquid chosen is one which volatilizes completely so that no contaminating residue is left in the cathode. However, if such a residue is inert to the chemicals in the electrochemical cell, a non-totally volatilized liquid may also be used so long as the residue does not significantly affect the cathode composition.

The following are utilizable as liquids in the practice of the invention: glycols, such as ethylene glycol, butylene glycol and 2, 3-hexanediol; alcohols, particularly lower molecular weight alcohols, such as methanol, ethanol, and isopropanol; ketones, such as acetone, methylethylketone, and diethyl ketone alhoxy-or aralhyloxy- substituted alcohols, such as 2-methoxy-ethanol, 2-ethoxy-ethanol, 2-benzyloxy-ethanol; 2-butoxy-ethanol, and amides, such as formamide; amines, such as isobutylamine and tert-butylamine; water; and mixtures thereof, particularly mixtures of water with the other liquids. However, water, glycols, alcohols and mixtures thereof form the presently preferred group from which the liquid may be selected.

The wet mixing time is that period which is required to form a uniform slurry of the various ingredients. That period is affected by the particular equipment used, the liquid selected, and the blend of ingredients in the slurry.

As stated above, any forming process which utilizes a highly viscous medium may be incorporated into the method of the present invention. Extruding, rolling and molding are the presently preferred formation procedures. The specific one chosen is most often decided by the particular shape into which the dough is to be formed. This fact forms one of the most important features of the invention in that the cathode may be of any configuration which is found desirable by the cell designer.

The curing step of the procedure accomplishes two separate functions. Firstly, the liquid is removed from the formed cathode. Secondly, the mechanical binder is cured so that the binder particles become linked thereby capturing the carbon particles within a resulting highly porous matrix. These two functions may be performed separately or simultaneously and the time and temperatures required depend on the liquid and mechanical binder used and commercial practicality since generally an increase in temperature will shorten the process time.

A thin alkali metal anode disc 20 is fitted within and is in electrical and mechanical contact with the inner surface of the other cover member 12. In a preferred form of the cell where the anode material is lithium, the disc of lithium is merely pressed into position against the surface of the cover member 12, and a sufficient mechanical and electrical bond is established therebetween.

A thin porous separator 22 is interposed between and in contact with the anode and cathode. A typical such separator is a thin sheet of glass fiber impregnated paper.

Finally, an effective quantity of an electrolytic solution comprising an ionically conductive solute dissolved in an inorganic oxyhalide or thiohalide solvent is diffused throughout the porous carbon cathode and the porous separator. In these cells, the inorganic oxyhalide or thiohalide solvent functions as the cathode depolarizer and is electrochemically reduced on the carbon cathode during discharge of the cell. The solvent is selected from the group consisting of phosphorus oxychloride, monofluorophosphoryl dichloride, thionyl chloride, sulfuryl chloride, monobromophosphoryl dichloride, thiophosphoryl chloride, thiophosphoryl bromide, phosphorus oxybromide, thionyl bromide, and mixtures thereof, and is preferably selected from the group consisting of phosphorus oxychloride, thionyl chloride, sulfuryl chloride and mixtures thereof.

It is preferred that the inorganic solvent material be dried prior to use. This may be accomplished by boiling this solvent material with clean lithium metal for 24 hours under an argon atmosphere. The solvent is then distilled at atmospheric pressure and the desired fraction is collected. The solvents thus prepared have low specific conductances. The electrolytes may be additionally dried by refluxing over lithium metal after the solute is added without the distillation step. Other suitable techniques and drying techniques are described in the published literature or will be apparent to those skilled in this art.

In general, the solvents utilized in the cells of the present invention are thermodynamically stable relative to their constituent elements, differing in this respect from known prior art cells utilizing organic solvents. It should be noted, however, that the solvent listed above which is least stable thermodynamically is monofluorophosphoryl dichloride.

Solutes which can be dissolved in the solvent material provide at least one anion of the general formula $MX_4^-$, $M'X_6^-$, and $M''X_6^=$, where M is an element selected from the group consisting of boron and aluminum; M' is an element selected from the group consisting of phosphorus, arsenic, and antimony; M'' is an element selected from the group consisting of tin, zirconium and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsenates ($ASF_6^-$), hexafluoroantimonates ($SbF_6^-$) and hexachloroantimonates ($SbCl_6^-$). Examples of solutes yielding anions $M''X_6^-$ are: hexachlorostannates ($SnCl_6^-$), hexachlorozirconates ($ZrCl_6^-$) and hexachlorotitanates ($TiCl_6^=$). However, solutes yielding a halogen anion, particularly chlorides ($Cl^-$), bromides ($Br^-$), and iodides (I⁻), together with Lewis acids (such as $ZrCl_4$, $AlCl_3$, $BF_3$, $BCl_3$, etc.), perchlorates ($ClO_4^-$) and chlorosulfates ($SO_3Cl^-$) are also contemplated within the scope of this invention.

The solute also provides at least one cation. This cation may be an alkali metal, especially lithium, sodium, potassium, cesium, rubidium. Cations having the following general formula $R_4N^+$ where R is a radical selected from the group consisting of methyl, ethyl, propyl, isopropyl, butyl and isobutyl are also contemplated to be suitable for use in this invention. Examples of suitable cations are: tetramethylammonium $(CH_3)_4N^+$, tetraethylammonium $(C_2H_5)_4N^+$, tetrapropylammonium $(C_3H_7)_4N^+$, and titrabutylammonium $(C_4H_9)_4N^+$. These cations may be added as the tetraalkylammonium chloride, for example. The solute for a particular cell can be chosen to yield a combination of any of the anions and cations listed above, however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium chlorosulfate. Other preferred compounds are mixtures of alkali metal halides with Lewis acids; particularly lithium chloride or lithium fluoride with aluminum chloride ($AlCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus chloride ($PCl_5$), arsenic fluoride ($AsF_5$), arsenic chloride ($AsCl_5$), zinc chloride ($ZnCl_2$) or zirconium chloride ($ZrCl_4$).

A suitable separator can be employed to prevent the reaction of anode and cathode materials when no electric current flows through the external circuit. The separator prevents the diffusion of cathode material to the anode. Since the cathode material is not spontaneously reactive with the anode material, mechanical separators which only prevent contact between the two electrodes can be used. A wide variety of ceramic and plastic materials having small pore sizes are available. Examples of such materials include: alumina, beryllia, magnesia, zirconia, titania, porcelain, porous glass, fritted glass, glass fiber mat, nonwoven, porous polytetrafluoroethylene and other fluorinated polymers, polycarbonate, polyvinyl chloride, polyacrylonitrile and polyphenols.

The cells of the present invention are capable of providing open circuit voltages approaching 4 volts, are characterized by extremely flat discharge curves, and can deliver moderate amounts of power at high energy densities.

Other anode materials, other solvent materials and other suitable solutes along with a description of how the component parts of the electrochemical system interact are set forth in copending application Ser. No. 492,316, filed July 26, 1974, and assigned to the assignee of this application, which is incorporated herein by reference.

A typical cell constructed according to this invention has a height of about 2mm and a width (diameter) of about 23mm.

Primary electrochemical cells according to the present invention have been constructed and utilized which are only 2 millimeters in thickness. Such a configuration would have been impossible with prior art cells because the cathode materials were required to be pressed into a rigid disc configuration which would be destroyed by the flexing inherent in a cell of this thickness.

While there have been shown and described what are considered to be preferred embodiments of the present invention, it will be obvious to those of ordinary skill in the art that various modifications and alternations may be made therein without departing from the spirit of the invention as defined by the appended claims.

We claim:

1. An ultra-thin button-type primary electrochemical cell having a thickness of less than 5mm and comprising:
   a pair of shallow, opposed, dished cover members formed of conductive metallic material, the outer rim of a first one of the members fitting within the outer rim of the second one of the members so that a disc-shaped space is formed therebetween;
   an electrically insulating sealing gasket positioned between the outer rims of the cover members to electrically isolate the cover members from each other so that the respective cover members may act as the terminals of the primary electrochemical cell,
   the outer rim of the first one of the cover members being compressed against the sealing gasket thereby forcing the sealing gasket against the second cover member to seal the primary electrochemical cell;
   the sealing gasket being a ring having a rim which has an inwardly facing L-shaped cross-section so that the sealing gasket fits within the outer rim of the second cover member and the first cover member fits within the upright portion and against the base portion of the rim, the upright portion being inwardly distorted against the first cover member by the compressed outer rim of the second cover member, and wherein the sealing gasket is formed of a fluorocarbon polymer;
   a thin, porous carbon cathode disc including a mechanical binder for forming a binding network of chain-like connections between the cathodic particles, the cathode thereby having a flexible structure adapted to conform to the cell wall geometry, the cathode fitting within and being in mechanical and electrical contact with the inner surface of one of the cover members,
   the thin preformed porous carbon cathode having a conductive metallic screen current collector at a side thereof which is in mechanical and electrical contact with the respective cover member,
   the screen current collector of the thin preformed porous carbon cathode being spot-welded to the respective cover member;
   a thin lithium anode disc fitting within and being in mechanical and electrical contact with the inner surface of the other of the cover members, said lithium anode disc being pressed into the first cover member to form electrical contact therewith;
   a thin porous separator being interposed between and in contact with the anode and the cathode; and
   an effective quantity of an electrolytic solution comprising a solute dissolved in an inorganic oxyhalide or thiohalide solvent diffused through the cathode disc and the separator, wherein the solvent is selected from the group consisting of phosphorus oxychloride, thionyl chloride, sulfuryl chloride, and mixtures thereof; and wherein the solvent functions as the cathode depolarizer and is electrochemically reduced on the carbon cathode during discharge of the cell.

* * * * *